UNITED STATES PATENT OFFICE.

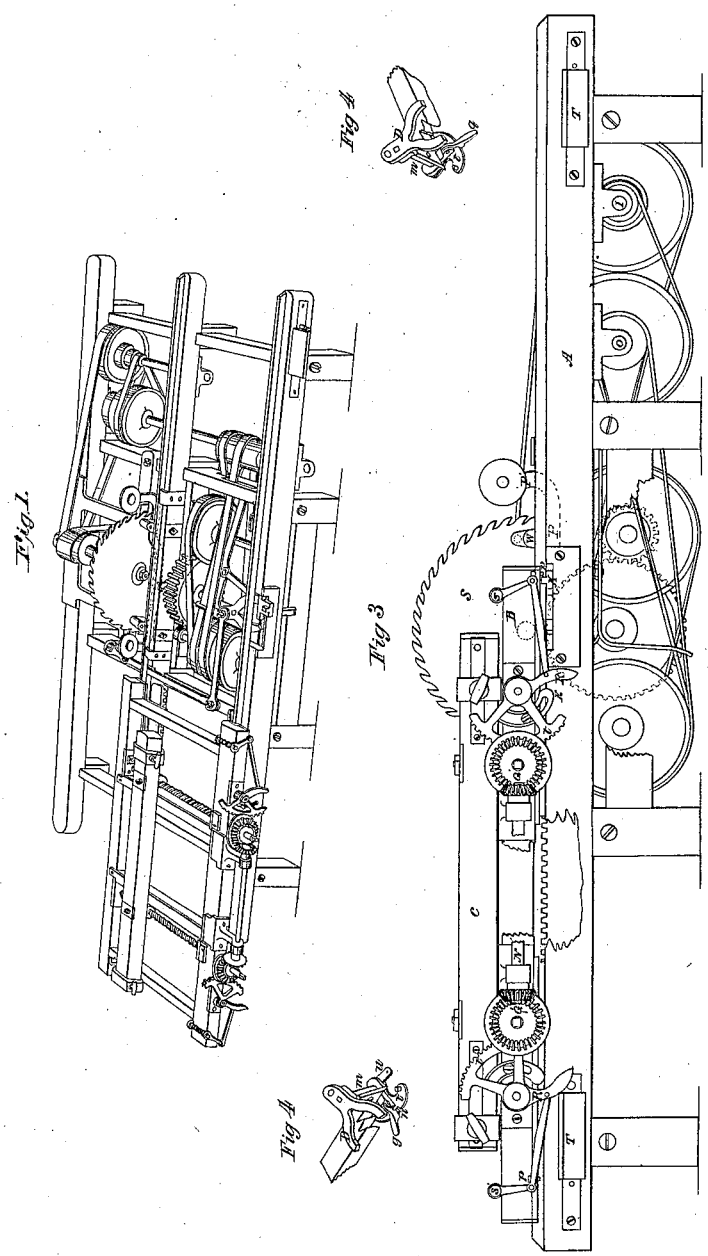

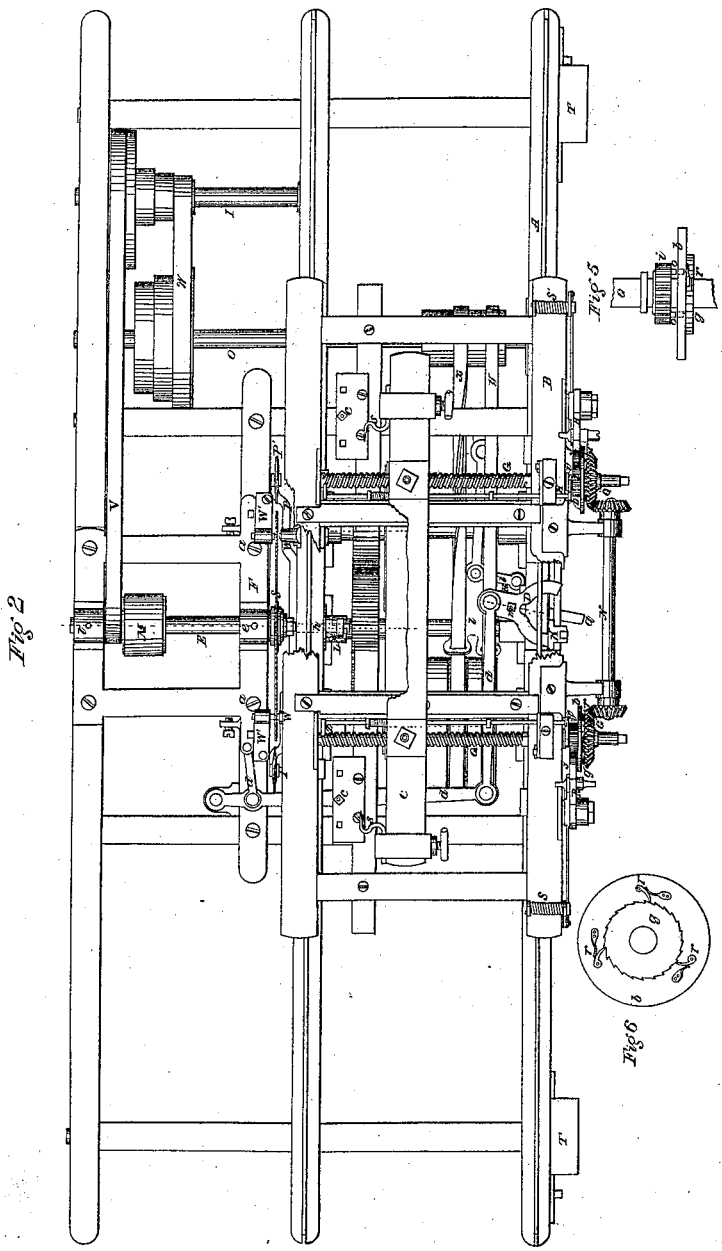

WM. HAWKINS AND WM. C. CLARY, OF MILWAUKEE, WISCONSIN.

SAWING-MILL.

Specification forming part of Letters Patent No. 19,774, dated March 30, 1858; Reissued May 11, 1858, No. 552.

*To all whom it may concern:*

Be it known that we, WILLIAM HAWKINS and WILLIAM C. CLARY, of Milwaukee, in the county of Milwaukee and State of Wisconsin, have invented a new and useful Improvement on Machines for Sawing Lumber; and we do declare that the following is a full, clear, and exact description of the construction and operation of the same, reference being had to the annexed drawings, and to the letters of reference marked thereon, making a part of this specification, in which—

Figure 1, is a perspective view. Fig. 2, is a top view. Fig. 3, is a side view. Fig. 4, is the double acting lever. Figs. 5 and 6, are the gearing and ratchet connected with the right and left handed screws.

A Figs. 2, and 3, is the main frame to which all the working parts are attached.

M, Fig. 2, is the main belt which rotates the saw shaft E, and gives the required power to cross belt $x$, and open belt, $y$, by connections of the intermediate belts and shafts, V, I, W, O moving the log carriage, B, both ways. The cross belt $x$, being on the tight pulley the log carriage, B, moves in direction (see arrow) Fig. 2, until the log passes the saw when the arm R, comes in contact with the set block T, and turns up the segment of a gear J, which by its connections rotates the screws G, G, and sets the log to the saw. The pin, $p$, in the carriage, B, now moves the slide, $k$, which turns the double acting lever, D, which by its connections sets the saw, S, oblique to the parallel line of the carriage the other way and the wedge roller P' is thrown down out of the way and wedge roller P'' is thrown up. The belt shipper, $l$, being connected to the lever D, the cross belt, $x$, is thrown on the loose pulley and open belt, $y$, on the tight pulley moves the carriage, B, in the opposite direction and goes through the same operation before described.

The saw shaft E Fig. 2, is hung in frame F at bearings, $e$, and $f$, the frame F, being held down by bolts $a, a, a, a$ in slots in frame F, under bolt heads and swings on a pivot under bearing, $f$, at the outside end of frame F. The frame F, being connected by levers, $d, d, d$, to double acting lever, D, is moved so as to set the saw oblique and alternately to the parallel line of the carriage so that the saw opposite the cutting edge is clear of the log when cutting in either direction. The advantage of this improvement is that a saw may be used that is thick in its center and thin on its cutting edge and not require set to the extent of its center thickness thereby using a stiffer saw cutting, less saw kerf and using less power.

P Fig. 2 is a lever which vibrates at its center, $h$. On each end of this lever there are wedge rollers P' P'', Figs. 2 and 3 or wedges may be attached to ends of lever, P, in place of wedge rollers to keep the board clear of saw, S, and are changed alternately by arm L which arm, L, is moved by pins, $c, c$, or it may be connected and worked by double acting lever, D.

$n, n$ Fig. 2, are stationary guides made fast to main frame A.

$n', n'$, Fig. 2, are swing guides attached to frame A, said swing guides being held to the saw by pins, $e, e$, in saw frame F. The screws G, G, are right and left handed which are connected to head block, C, which holds the log by dogs, $s, s$, on the screws, G, G.

$i, i$, are geared pinions; $b, b$, are ratchet plates; $g, g$, are ratchet wheels; G', G' are bevel gears. The pinions $i, i$, and ratchet plates, $b, b$, being loose the ratchet wheel, $g, g$, and bevel gears, G', G', are made fast the ratchet plates. $b$, Figs. 5, and 6 operates on ratchet wheel, $g$, by ratchets $r, r, r$ and pinion $i$ Fig. 5 operates plate, $b$, by pins $o, o$, which fit the holes made in plate, $b$, when arm R, Fig. 3, comes in contact with set block T and turns the segment of a gear, J, which works in pinion, $i$, and rotates screws G, G, which are connected by shaft, N, the pinion, $i$, plate, $b$ being loose lets the segment of a gear J drop back to its place. When the arm, R leaves the set block T ready to set again, the segment of a gear is changed by slide, $t''$, to determine the degree or extent of set intended to be given or arm, R, may be made to shift. The arm $v, v$, Fig. 2, on rods, $k, k$, is connected to pinions $i, i$; on the other end of rods $k$ are arms $z, z$, so that when the log is sawed up the nuts or screws, G, G come in contact with arms, $z, z$, and moving the rods $k$ $k$ and the arms, $v, v$, disconnect the pinions $i, i$, from plates, $b, b$, and stop setting. The double acting lever D Fig. 4, is made fast to the top of shaft $m$, which works in bearings attached to frame A. The lower end of shaft, $m$, is made fast to plate $t$ with notch, $n$, to receive the latch, $q$, connected to the angle lever, $u$. The angle lever $u$, swings on shaft, $m$, and is connected with link, $l'$. The latch, $q$, being raised out of notch $n$, and moved around shifts the belts $x$ and $y$, stops the motion of the carriage, B, without changing the position of double acting lever, D.

What we claim and wish to secure by Letters Patent is as follows:

1. We claim the manner herein described of automatically changing the saw after each cut, alternately from an oblique position in one direction to an oblique position in a contrary direction to the line of the log carriage, by means of the studs, $p$, slide $k$, double lever D, connecting rods $d$, in combination with the frame F and the guides $n$ and $n'$, for the purpose herein set forth.

2. We also claim the use of the two wedge rollers or wedges P' and P'' to keep the board clear of the saw while cutting in either direction substantially in the manner described.

3. We also claim the combination of pinions $i$, and their pins $o$, entering into recesses of plates $b$, the ratchet wheels $g$, the ratchets $r$, the adjustable segments J, the wheels G', the screws G, and the rods $k$, with their clutches $z$ and $v$, for the purpose of automatically setting the log to the saw and stopping the setting when the log frame advances too close to the saw.

4. We also claim the notched plate $t$, in combination with the latch $g$, lever $u$, and link $l'$, for the purpose of operating the belt shifter $l$, without turning the lever $l$, substantially in the manner set forth.

Milwaukee, January 6, 1858.

WILLIAM HAWKINS.
WILLIAM C. CLARY.

Witnesses:
GEO. W. MYGATT,
DAVID R. BROWN.

[FIRST PRINTED 1912.]